United States Patent [19]

Schwartz

[11] 4,031,379
[45] June 21, 1977

[54] PROPAGATION LINE ADDER AND METHOD FOR BINARY ADDITION
[75] Inventor: Samuel Schwartz, Saratoga, Calif.
[73] Assignee: Intel Corporation, Santa Clara, Calif.
[22] Filed: Feb. 23, 1976
[21] Appl. No.: 660,693
[52] U.S. Cl. .............................................. 235/175
[51] Int. Cl.² ...................................... G06F 7/50
[58] Field of Search ................................... 235/175
[56] References Cited
UNITED STATES PATENTS

| 3,717,755 | 2/1973 | Briley | 235/175 |
| 3,743,824 | 7/1973 | Smith | 235/175 |
| 3,843,876 | 10/1974 | Fette et al. | 235/175 |
| 3,970,833 | 7/1976 | Gelweiler | 235/175 |

OTHER PUBLICATIONS
C. W. Weller, "A High–Speed Carry Ckt. for Binary Adders," IEEE Trans. on Computers vol. C–18, No.8, Aug. 1969, pp. 728–732.

*Primary Examiner*—David H. Malzahn
*Attorney, Agent, or Firm*—Spensley, Horn, Jubas & Lubitz

[57] ABSTRACT

A propagation line adder may be fabricated by replicating a unit circuit along a sense and reference propagation path. Each unit circuit corresponds to bits of the same order of magnitude of the binary addends. Selected segments of the sense propagation path are set a specified logical potential value and are coupled according to control signals generated within the unit circuit in response to the addend bits. The reference propagation path is then discharged and a sense amplifier, coupled to each segment of the reference and sense propagation paths, detects the state on corresponding segment of the sense propagation path. The propagation line adder implements an algorithm which produces the binary sum of two numbers by complementing the exclusive-or function of the addends according to a shifted product function. The shifted product function includes a carry in bit as its lowest order bit.

21 Claims, 7 Drawing Figures

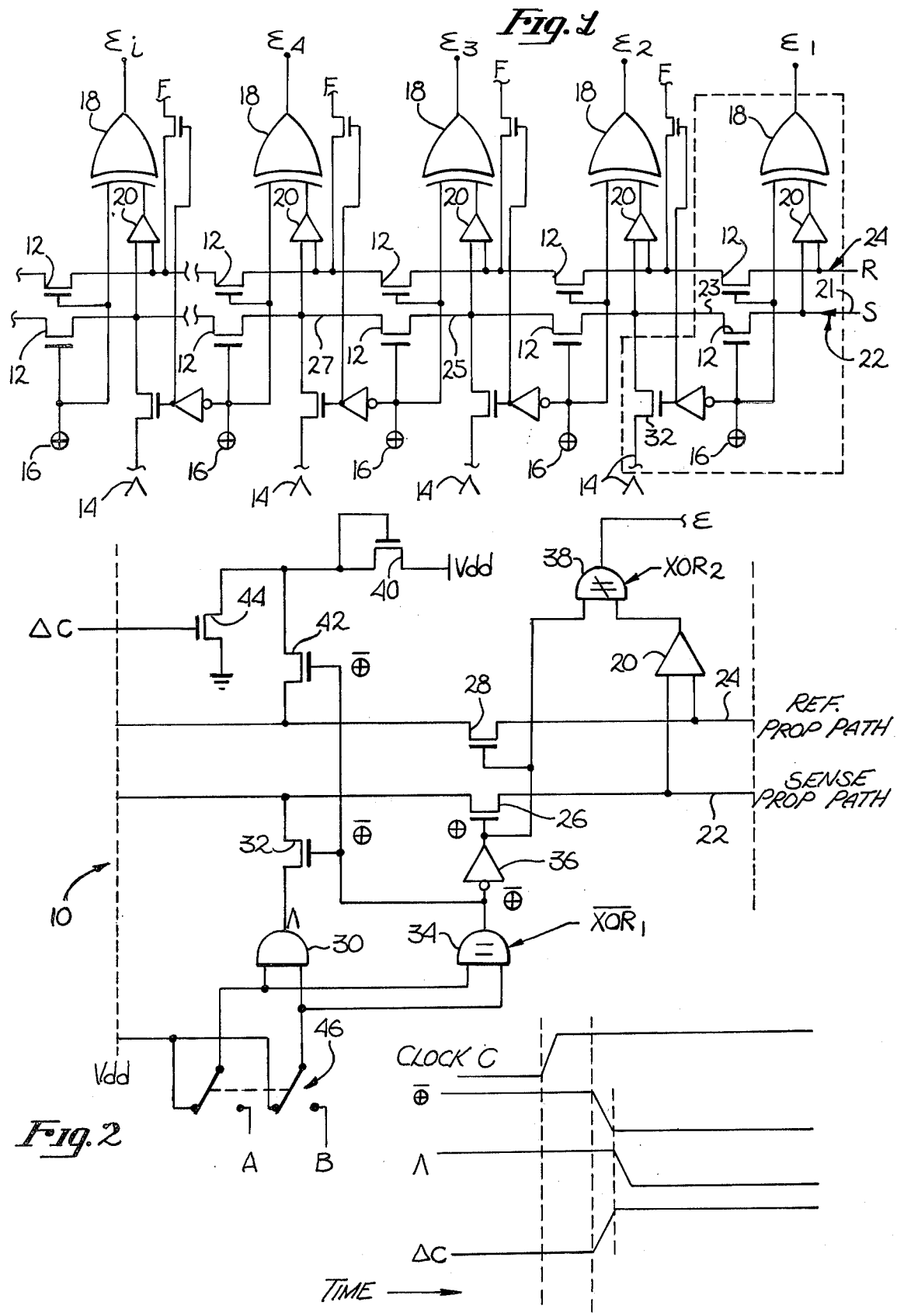

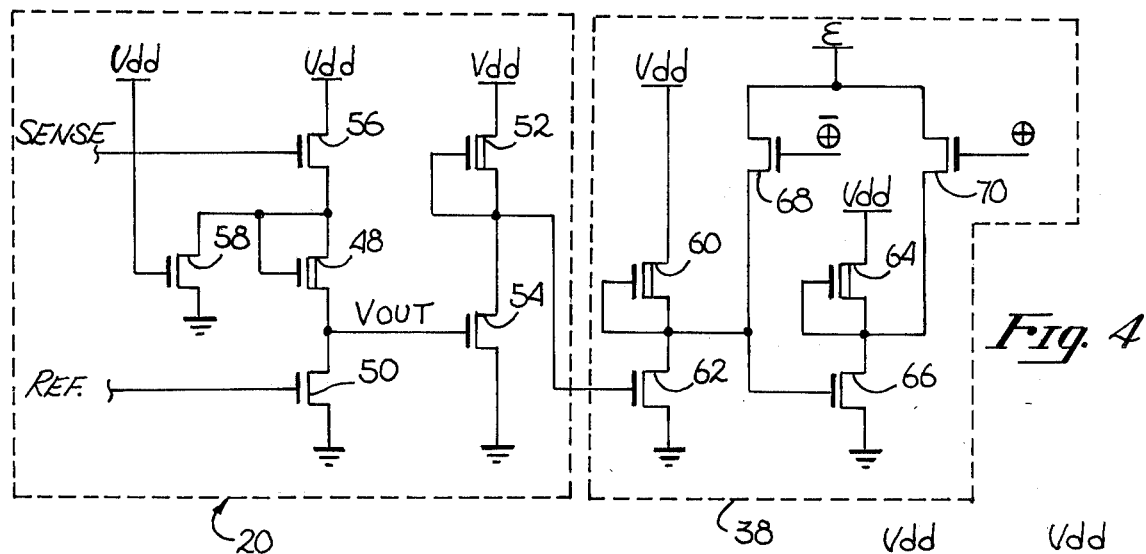
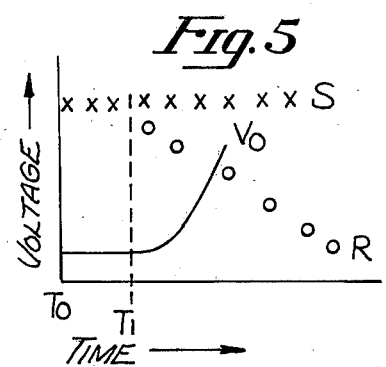
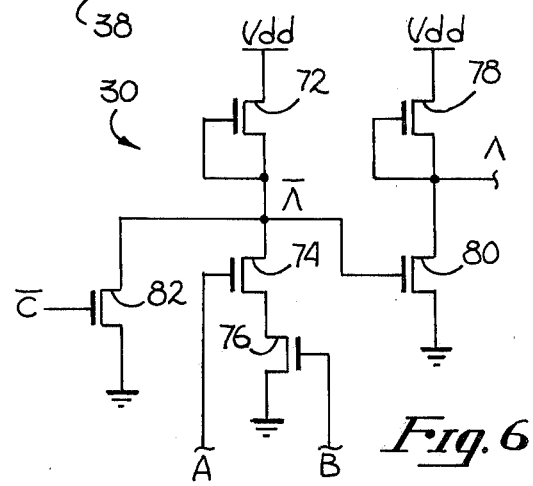
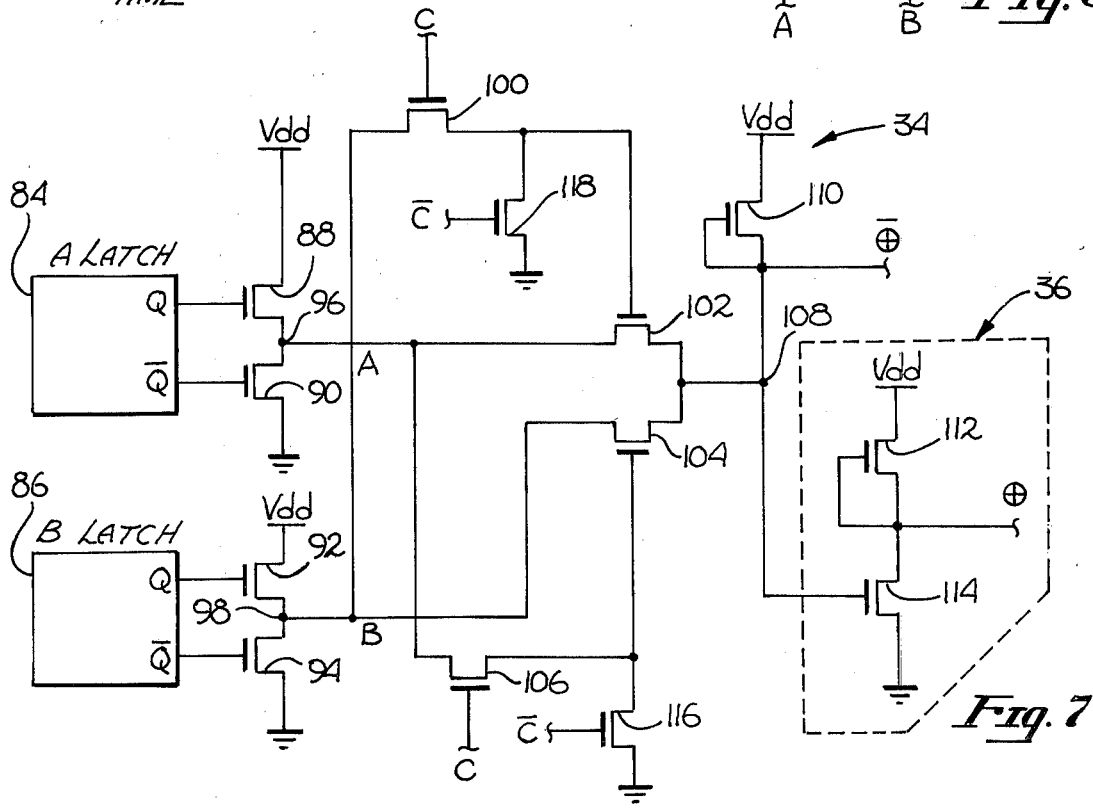

PROPAGATION LINE ADDER AND METHOD FOR BINARY ADDITION

BACKGROUND OF THE INVENTION

1. Field of the Invention

The present invention relates to the field of integrated circuit binary adders and in particular to binary adders employing a segmented propagation path.

2. Description of the Prior Art

The addition of multiple-bit binary numbers can be implemented two ways. First, the arithmetic operations can be performed serially, i.e., each order of bits is added in sequential order. The alternate method is parallel addition, in which each order of bits is added simultaneously. In a parallel adder, a full adder is usually required for each order of bits to accept a possible carry from the proceeding stage or order of bits. The serial binary adder requires only one adder. Data bits are shifted serially into and out of the adder by means of shift registers. Arithmetic operations in a serial adder are usually slower than in a comparable parallel adder. Even though only one adder is used, an obvious disadvantage of a serial adder is that three shift registers are required, i.e., two input shift registers and an output shift register. Ripple through or asynchronous adders are parallel adders which operate on each binary pair of bits while the carry bit is serially transferred to the next stage. Thus, the second pair of bits must wait until the addition of the first pair of bits is completed. This results in a delay in the carry input to the second and following adders and a delay in the output of the sum carry out bit. Typically, in parallel adders a carry look ahead principle is employed. The principle of carry look-ahead is to examine a number of stages of inputs to the adder and simultaneously to produce the proper carry for each of these stages. Each carry is then applied to the adder corresponding to the appropriate bit. The addition of the carry then produces the proper sum. The circuit complexity of parallel full adders increases as the number of bits manipulated by the full adder is increased. For example, Texas Instrument Ser. No. 7483A is a four bit binary full adder and employs a minimum of 36 gates to perform the addition of two four bit numbers. Thus, multiple bit binary numbers exceeding four orders must be serially combined. Each four bit adder must wait for the carry out of the proceeding adder before performing its operation. This configuration entails both relatively slow circuit speeds and large amounts of silicon chip area.

BRIEF SUMMARY OF THE INVENTION

The present invention is a binary adder for adding at least two multiple bit binary numbers. The binary adder comprises a conductive reference propagation path having a plurality of segments and a conductive sense propagation path having a plurality of segments. A plurality of gating means are in series circuit with the segments of reference and sense propagation paths. The gating means selectively couples each of the segments of the reference propagation path together and each of the segments of the sense propagation path together. A plurality of product circuit means are employed for generating a logical product signal of each order of bits of the multiple bit binary numbers. The product circuit means couples the product signal to the segment of the sense propagation path corresponding to the next higher order of bits. A plurality of summing circuit means are employed to generate a logical sum signal of each order of bits of the multiple bit binary numbers to be added. The summing circuit means selectively couples the sum signal to at least some of the gating means. Finally, the present invention includes a plurality of output circuit means each of which are coupled to one of the summing circuit means and to a selected segment of the sense propagation path.

The present invention further comprises a plurality of sense amplifier means each coupled to selected points on the reference and sense propagation paths. Each of the sense amplifiers also has an output coupled to one of the output circuit means. The sense amplifier means detects a potential difference between a selected point on the reference and sense propagation paths, generates a detection signal and couples the detection signal to the output circuit means.

The method of the present invention comprises precharging at least some segments of the segmented sense propagation path and each segment of the segmented reference propagation path to a logical high potential value. Each segment of the sense propagation path is paired with a segment of the reference propagation path and corresponds to a selected order of bits of the multiple bit binary addends. A plurality of sum signals and product signals are then generated in a corresponding plurality of summing circuit means and product circuit means respectively.

Each of the product circuit means generates one of the product signals. Each product has a logical potential value signal equivalent to the logical product function of the order of bits corresponding to one of the sense and reference propagation path segments. Each of the summing circuit means generates one of the sum signals. The sum signal has a logical potential value equivalent to the logical exclusive-nor function of the order of bits corresponding to the associated sense reference propagation path segment. Each pair of the segments has a corresponding summing and product circuit means associated thereto. Each of the sum signals is coupled to a corresponding carry gating means, to a corresponding inverter coupled to a propagation gating means, and to a corresponding output circuit means. Each of the carry gating means selectively couples one of the product signals to a segment of the sense propagation path which corresponds to the next higher order of the addend bits. Each of the propagation gating means selectively couples the corresponding pair of segments of the sense and reference propagation paths to segments of the sense and reference propagation paths corresponding to the next higher order of bits respectively. Each of the output circuit means generates an output signal having a logical potential value which is equivalent to the exclusive-or function of the corresponding sum signal and of the logical potential value of the corresponding segment of the sense propagation path.

Each of the segments of the reference propagation path is then selectively discharged. Each of the output signals generated by the output circuit means are valid during the discharge of the corresponding segment of the reference propagation path.

BRIEF DESCRIPTION OF THE DRAWINGS

FIG. 1 is a simplified schematic of the propagation line adder of the present invention showing circuitry for adding at least two five bit binary numbers.

FIG. 2 is a simplified schematic which illustrates in greater detail the circuitry of a unit circuit corresponding to each order of bits of the binary addends.

FIG. 3 is a simplified timing diagram referring to various logical signals of unit circuit of FIG. 2.

FIG. 4 is a detailed schematic of the one embodiment of sense amplifier and output circuit means.

FIG. 5 is a graphical illustration of the input and output responses of the sense amplifier.

FIG. 6 is a detailed schematic of one embodiment of the product circuit means.

FIG. 7 is a detailed schematic of one embodiment of the summing circuit means.

DETAILED DESCRIPTION OF THE PREFERRED EMBODIMENTS

The present invention is a fast, multiple bit binary adder which utilizes a minimal area of silicon in an integrated circuit. The operation of the binary adder is based upon a segmented reference propagation path and a segmented sense propagation path. Each segment of the sense and reference propagation paths are paired and correspond to one order of bits of the binary addends. Each segment of the reference propagation path and sense propagation path is selectively coupled by a gating means in series circuit. A logical product function and exclusive-or function signal, corresponding to the nth order of bits, controls the gating means which couples the segments of the reference and sense propagation paths, corresponding to the nth order bits, to the segments of the sense and reference propagation paths which correspond to the $(n + 1)$th order of bits. The logical product function signal corresponding to the nth order of bits is selectively coupled to the segment of the sense propagation path corresponding to the $(n + 1)$th order of bits.

The organization and operation of the present invention may now be understood in light of the above described algorithm by reviewing FIGS. 1 – 7. In particular, in FIG. 1 the propagation line adder can be seen to be a series of unit circuits 10 which are replicated. Each unit circuit includes a gating means 12, a product circuit means 14, a summing circuit means 16, an output circuit means 18, a precharging means 19 and a sense amplifier means 20. Each unit circuit 10 corresponds to one order of bits of the addends. A sense propagation path 22 is formed by a plurality of connected segments coupled by the corresponding gating means 12 of each unit circuit 10. Similarly, a segmented reference path is formed by similar interconnecting segments coupled by the corresponding gating means 12 of each unit circuit 10.

A product signal is generated by each product circuit means 14. The product signal has logical potential values equivalent to the product function of that order of bits corresponding to the associated unit circuit 10. Similarly, each summing circuit means 16 generates a sum signal having logical potential values equivalent to the exclusive-or function of the order bits corresponding to its unit circuit 10. The sum signal generated by summing circuit means 16 controls the gating means 12 thereby selectively coupling adjacent segments of sense propagation path 22 and reference propagation path 24. Sense amplifier 20, associated with a given order of bits, has its inputs coupled to sense propagation path 22 and reference propagation path 24. Output circuit means 18 generates an output signal which has logical potential values equivalent to the exclusive-or function of the sum signal and the output of sense amplifier means 20. Precharging means 19 will charge and discharge the associated node of the reference propagation path by an appropriately delayed timing signal as discussed below.

The operation of the present invention may now be conceptualized in relationship to the various elements illustrated in FIG. 1. It is to be understood that where MOS devices are used, the present invention includes either enhancement or depletion type devices and any logic format well known to the art. For the present illustration, depletion type devices employing positive logic is usually assumed. Each segment of reference propagation path 24 is precharged. Simultaneously, each segment of sense propagation path 22 is also precharged, but not necessarily including a first segment 21 corresponding to the lowest order bits of the addends. Product and sum signals are then generated by product circuit means 14 and summing circuit means 16 respectively for each unit circuit 10. If the sum signal is a logical high potential value, representing a binary one, the corresponding gating means 12 will become conductive. The corresponding product signal will necessarily be the complement of the sum signal (exclusive-or function) and will be a low potential value representing a binary zero.

Assume, for example, that the addends are the three bit binary numbers 110 and 101, the zeroth order sum signal will represent a binary one. The zeroth order product signal will represent a binary zero. Segment 23 of sense propagation path 22 will remain high since gating device 32 will remain non-conductive. The high sum signal will turn gating means 12 on thereby coupling adjacent segments of the sense and reference propagation paths 22 and 24 respectively. If the external carry-in has a low potential value, representing a binary zero, the output of the zeroth order gating means, or equivalently, the input to the first order gating means, segment 23, will go low. Reference propagation path 24 is simultaneously discharged by means described in greater detail below. As will be described, sense amplifier 20 will have a low output when both of its inputs are low or going low. The zeroth order output circuit means 18 will have a high output since the corresponding output of sense amplifier 20 is low and the corresponding sum signal is high.

Continuing with the same addends, 110 and 101, the first order product signal will be low and the first order sum signal high. As in the zeroth order circuit 10, the first order output signal assumes a high potential value. However, the second order sum signal will be low and the second order product signal high. Thus, the third gating means 12 will be nonconductibe and adjacent segments 25 and 27 of the sense propagation path will remain uncoupled. The inputs to the second order output circuit means 18 will now both be low and the second order output signal will assume a low potential value. The second order product signal is coupled to segment 27 of sense propagation path 22 and to sense amplifier 20 corresponding to the third order bits. As described in greater detail below, sense amplifier 20 of the third order bit will have a high output when reference propagation path 24 discharges if its input, coupled to the sense propagation segment 27 corresponding to the product signal, remains high. The sum signal of the third order bit is zero since in the present example each digit of the addends is a binary zero from the third order and higher. Thus, output circuit means 18 corresponding to the third order bit will have one low and one high input thereby generating an output signal having a high potential value. All higher order output signals will be zero since each of the associated sum and product signals in each order will also be zero. In summary, the output signals, in the present example, beginning at the third order bit, will represent a binary number 1011 which is the binary sum of the addends.

Had the external carry-in been a high potential value, it can readily be seen that, in the present example, the output signals of the zeroth and first order output circuit means 18 would both represent logical zeroes. The external carry in signal would be propagated through the first two gating means 12 and be detected by sense amplifier means 20 corresponding to the second order bit. Since the sum signal of the second order bit represents a binary zero, the output signal of output circuit means 18 corresponding to the second order bit would represent a binary one. The operation of unit circuits 10 corresponding to the third order bits and higher would be identical to that previously described since gating means 12 of the second order bit would be non-conductive. Therefore, in the present example if the external carry-in signal represented a binary one the outputted signals would represent the binary number 1100, which corresponds to the sum of the addends including the external carry-in bit.

It can also be readily appreciated that the product signals of product circuit means 14 have been shifted to the left, i.e., that the product signal of the zeroth order unit circuit 10 is coupled to the first order unit circuit 10; the product circuit of the first order unit circuit 10 is coupled to the second order unit circuit 10 and so forth. This shifted coupling corresponds to the shifted product function of the algorithm. Output circuit means 18 always outputs a bit corresponding to the exclusive-or function unless the carry-in or the shifted product signal represents a binary one. In such a case, output circuit means 18 generates the complement of the exclusive-or function or the sum signal. The activation of gating means 12 transfers the external carry-in signal along sense propagation path 22 until it reaches a gating means 12 which is not conductive by reason of the corresponding sum signal being a binary zero. The output signal corresponding to nonconductive gating means 12 will be equivalent to the logical complement of the sum signal. As in the algorithm, the circuit operation is then repeated for higher orders of unit circuits 10.

The structure and operation of each unit circuit 10 may be better understood by viewing FIG. 2. In the presently preferred embodiment gating means 12 is comprised of two MOS field effect transistors acting as gating devices 26 and 28. Product circuit means 14 is generally denoted by an AND gate 30 and a gating device 32. Summing circuit means 16 is comprised of an exclusive-nor gate 34 and an inverter 36. Output circuit means 18 is comprised of exclusive-or gate 38. Also coupled to each segment of reference propagation path 24 is precharging means 19. The precharging means includes a load device 40 coupled to a gating device 42. The output of load device 40 is also coupled with a second gating device 44 which in turn is coupled to ground.

Specific operation of each unit circuit 10 may now be understood in reference to FIG. 2. During the first clock cycle switching means 46 is in a first position which couples both inputs of AND gate 30 and exclusive-nor gate 34 to a high potential value or a power supply. Switching means 46 is schematically illustrated for the purposes of illustration only, as a ganged mechanical switch. Any circuit configuration well known to the art may be employed to effectuate the operation of switching means 46. High potential values simultaneously presented to the inputs of both AND gate 30 and exclusive-nor gate 34 produce high outputs in each case. The output of exclusive-nor gate 34 is coupled to the control gate of gating device 32. Thus, during the precharging cycle the output of exclusive-nor gate 34 is simultaneously high with the output of AND gate 30. Gating device 32 has its control gate coupled to the output of exclusive-nor gate 34.

Thus, during the precharging cycle AND gate 30 charges its corresponding segment of sense propagation path 22 to a high logical value, while inverter 36 retains each segment of reference and propagation paths 24 and 22 in a decoupled state by means of gating devices 26 and 28. The output of exclusive-nor gate 34 also simultaneously controls gating device 42 thereby precharging the corresponding segment of reference propagation path 24 through load device 40. The initial input reference segment to the right of the first gating device 28, may also be precharged by a similar means. It is to be further understood that each of the segments of reference propagation path 24 and sense propagation path 22 may be precharged by any other means well known to the art and the present invention is not limited by the embodiment specifically illustrated in FIG. 2.

After the precharging cycle, switching means 46 switches to the state where data inputs A and B are presented to the inputs of AND gate 30 and exclusive-nor gate 34 at each unit circuit 10. AND gate 30 and exclusive-nor gate 34 generate the product and exclusive-nor functions of the binary inputs in each unit circuit 10. After the exclusive-nor function $\oplus$ changes state, gating devices 32 and 42 are clocked on, coupling their corresponding circuitry to segments of sense propagation path 22 and reference propagation path 24 respectively.

FIG. 3 is a timing diagram illustrating the time sequences of an enabling clock, C; exclusive-nor,$\overline{\oplus}$; exclusive-or,$\oplus$; product function, $\wedge$ ; and a delayed clock, $\Delta$ C in the example where A=0 and B=1. As previously discussed, during the quiescent phase, the output of AND gate 30, the product function, $\wedge$ , and the output of exclusive-nor gate 34, the function,$\overline{\oplus}$, are both high while all other clocks are low. Thus, all the nodes of the reference and sense propagation paths are precharged. When switching means 46 switches to data inputs, A and B, the circuit goes through a transition phase.

In the example illustrated in FIG. 3, A or B are binary ones, but not both. The exclusive-or function is thus a binary one while the product function is a binary zero. If gating device 32 were omitted, and AND gate 30 were directly coupled to the corresponding segment of sense propagation path 22, during the transition phase, AND gate 30 could discharge the corresponding segment of sense propagation path 22. At the same time the exclusive-or function would cause gating device 26 to become conductive thereby possibly presenting a binary one carry from the adjacent segment of sense propagation path 22. It is a characteristic feature of MOS circuitry that circuit nodes may be discharged quickly while charging consumes appreciably greater time. The binary one carry, gated through coupling device 26, would then slowly recharge the just discharged segment, assuming that AND gate 30 were somehow decoupled from its corresponding segment. Rather than precharging, discharging, and then recharging by a binary carry, circuit speed may be enhanced by gating the output of AND gate 30 to the corresponding segment of sense propagation path 22 by means of gating device 32. It is important, however, that AND gate 30 be decoupled from its corresponding segment during the transition phase before the quiescent output of AND gate 30 begins to go low. As shown in FIG. 3, the exclusive-nor function, signal$\overline{\oplus}$, leads the product function, product signal.

As is discussed in greater detail in reference to FIGS. 4 and 5, sense amplifier 20 detects the difference between the potential of sense propagation path 22 and reference propagation path 24. Gating device 44 is clocked by a delayed clock signal, $\Delta C$, so that the corresponding segments of reference propagation path 24 are not discharged until the product signal $\wedge$, and signal,$\overline{\oplus}$, have been generated and coupled to their respective gating devices. Therefore, the output of each sense amplifier 20 and each unit circuit 10 will always be valid and will not represent a transient phase.

The timing and operation of each of the circuits illustrated in FIG. 2 and the timing signals of FIG. 3 are better understood by viewing FIGS. 4 – 7. In particular, FIG. 4 illustrates a schematic of sense amplifier 20 coupled to exclusive-or gate 38. Sense amplifier 20 may be conceptualized as being comprised of two inverter stages. An input stage is comprised of a bootstrapped load device 48 and source follower 56 in series circuit with a driver device 50. An inverter stage is comprised of a load device 52 in series circuit with a driver device 54. In the case where load device 48 is an MOS field effect transistor its gate and first region are both coupled together to one terminal of a high impedance device 58. High impedance device 58 may be any integrated circuit device well known to the art characterized by a large impedance. In the preferred embodiment, high impedance device 58 is an MOS field effect transistor having a high transmission impedance coupled between the gate of first region of load device 48 and ground. The gate of high impedance device 58 is coupled to power supply, Vdd.

The output of the first inverter stage of sense amplifier 20 is taken from the second region of load device 48. The gates of source follower 56 and driver device 50 provide the inputs to the first inverter stage. The gate of source follower 56 is coupled to the corresponding segment of sense propagation path 22 while the gate of driver device 50 is coupled to the corresponding segment of reference propagation path 24.

The operation of sense amplifier 20 is illustrated in FIG. 5. As previously discussed, during the quiescent phase between times T0 and T1, each segment of reference propagation path 24 and each segment of sense propagation path 22, with possible exclusion of the first segment, it precharged to a binary one or high potential value. During the operational phase, after time T1, each segment of reference propagation path 24 is discharged. If, as shown in FIG. 5, the corresponding segment of sense propagation path 22 remains high, the output V0, of sense amplifier 20 will rise dramatically in proportion to the difference between the potential value of the corresponding segments of sense and reference propagation paths 22 and 24.

Referring now to FIG. 4 assume a binary one has been written onto the corresponding segment of sense propagation path 22 and the corresponding segment of reference propagation path 24 remains precharged. Gating device 56 and driver device 50 will both be conductive causing the output of the first inverter stage V0 to remain low. After clock signal C, of FIG. 3 goes high and the product and sum signals have been generated, delayed clock signal $\Delta C$, will also go high causing each segment of reference propagation path 24 to begin to discharge. If the corresponding segment of sense propagation path 22 remains high, source follower 56 remains conductive as driver device 50 decreases in conductivity. The output of the first inverter stage will therefore rise to a high potential value. The second inverter stage will invert the output, V0, and will generate a low output.

High impedance device 58 draws sufficiently low current such that the gate of load device 48 remains at a high potential level and load device 48 remains conductive. However, should the corresponding segment of sense propagation path 22 also be discharged, simultaneously with the associated segment of reference propagation path 24, source follower 56 and driver device 50 will simultaneously begin to turn off. The desired output of the first inverter stage in such a circumstance is a binary zero. High impedance device 58 discharges the nodes of the first inverter stage of sense amplifier 20 in such a fashion that the gate of driver device 54 is discharged through load device 48 before load device 48 becomes nonconductive. Thus, even though both of the inputs to the first inverter stage are low, the output will not be floating, but will be set at a low potential value.

Exclusive-or gate 38 of FIG. 4 may also be conceptualized as being comprised of a first and second inverter stage. The first inverter stage is comprised of load device 60 in series circuit with driver device 62. The second inverter stage is comprised of load device 64 in series circuit with driver device 66. The output of load device 60 is coupled to the output terminal, $\Sigma$, through a gating device 68. Similarly, the output of the second inverter stage is coupled to the output, $\Sigma$, through a gating device 70.

If as in FIG. 5 the corresponding segment of sense propagation path 22 remains high, a binary zero or low potential value will be presented to the input of exclusive-or gate 38 from sense amplifier 20. The input of exclusive-or gate 38 is coupled to the gate of driver device 62. The binary zero or low potential value at the input of exclusive-or gate 38 is inverted into a binary one or high potential value at the output of the first inverter stage, and as a binary zero or low potential value at the output of the second inverter stage. Depending on whether the sum signal is high or low, gating devices 70 or 68 respectively will be turned on. Thus, if a binary one is on the corresponding segment of sense propagation path 22 and sum signal$\oplus$, is high, the information will be complemented and a binary zero will be presented at the output terminal $\Sigma$. If the sum signal O is low, gating device 68 will become conductive, and the information at the corresponding segment at sense propagation path 22 will be presented at output terminal $\Sigma$.

Finally, it will be noted that the exclusive-or signal,$\oplus$, is shown in FIG. 2 as coupled to exclusive-or gate 38 by means of direct coupling through inverter 36. The complement, the exclusive-nor function,$\overline{\oplus}$, is also an input of exclusive-or gate 38. As shown in FIG. 4, it may be drawn from the gate of gating device 42. Thus, for each unit circuit 10, exclusive-or, $\oplus$, and exclusive-nor, $\overline{\oplus}$, signals are present at nodes on each side of reference and sense propagation paths 24 and 22. Thus, a single conductive path for each signal crossing, the propagation paths 22 and 24, is required in the integrated circuit topology of the present invention.

FIG. 6 is a schematic of AND gate 30 and again may be conceptualized as two inverter stages. A first inverter stage is comprised of a load device 72 in series circuit with series driver devices 74 and 76. The second inverter stage is comprised of a load device 78 in series circuit with driver device 80. In the case where MOS field effect transistors are used, data inputs, A and B, are coupled to the gates of series driver devices 74 and 76 respectively. Thus, the output of the first inverter stage will always remain high except when both data inputs A and B are high. In that case, the output of the first inverter stage will go low. Clearly, the output of the first inverter stage is the logical complement of the product function of data inputs, A and B. The uncomplemented data product function is then presented as the output of the second inverter stage.

Gating device 82 forms part of switching means 46 of FIG. 2. During the quiescent phase as shown in FIG. 3, clock C is low so that gating device 82 is conductive. Thus, the output of AND gate 30 or the output of the second inverter stage illustrated in FIG. 6 remains high or a binary one as long as clock C remains low. When clock, C, goes high, gating device 82 becomes nonconductive and the output of the second inverter stage is controlled according to data inputs A and B of the first inverter stage.

FIG. 7 is a schematic diagram of exclusive-nor gate 34 and inverter 36 of FIG. 2. Binary inputs A and B are shown as generated by double railed latches 84 and 86 respectively. However, any means well known to the art may be provided for generating the binary inputs. By way of example only the output of latch 84 is shown as coupled to a gate of a pull up device 88 while the complement output is coupled to the gate of a pull down device 90. Similarly, the outputs of latch 86 are shown as coupled to the gates of pull up device 92 and pull down device 94. Thus, if latch 84 corresponding to binary input, A, is a binary one, pull down device 90 will be nonconductive while pull up device 88 will be conductive. The high potential value or binary one will then be written on node 96. During the operational phase of the circuit, as illustrated in FIG. 3, clock, C, will be high thus gating device 100 will be conductive. Similarly, if the output of latch 86 corresponding to data input B is high, pull up device 92 will be conductive while pull down device 94 will be nonconductive. Node 98 will have a high potential value which will be coupled through gating device 100 during the operational phase to the control gate of logic gating device 102. Similarly, the high potential value at node 96, will be coupled through gating device 106 during the operational phase to the control gate of logic gating device 104. Thus, a high potential value will be assumed at node 108 whenever both data inputs, A and B, are high.

However, if latch 86 corresponding to data input B is low, pull up device 92 is nonconductive while pull down device 94 is conductive. The potential value at node 98 will be low causing logic gating device 102 to remain nonconductive. If the potential at node 96 was high, logic gating device 104 would become conductive. Thus, the low potential value at node 98 would be presented at node 108. If either one of data inputs, A or B, is low while the other is high, node 108 is set at a low potential value.

Finally, if both latch 84 and 86 have low outputs, pull up devices 88 and 92 would remain nonconductive while pull down devices 90 and 94 become conductive. Both nodes 96 and 98 would be set at a low potential value. Therefore, during the operational phase, both logic gating devices 104 and 102 remain nonconductive and node 108 is not coupled to either latch 84 or 86. Node 108 is coupled to a boot-strapped load device 110 and the input of an inverter stage 36. Thus, when both latches 84 and 86 have low outputs, the output of load device 110 pulls node 108 to a high potential value. Inverter stage 36, which is comprised of load device 112 and driver device 114, thus has a high potential value as an input and, therefore, generates a low potential value output. In all other cases, the potential at node 108 is set according to the states of logic gating devices 102 and 104 and circuitry associated therewith. The output from load device 110 corresponds to the exclusive-nor function of data inputs A and B. Clearly the output of inverter stage 36 corresponds to the exclusive-or function of data inputs A and B.

During the quiescent phase of the circuit operation, clock, C, will be low causing logic gating devices 102 and 104 to be decoupled from latches 84 and 86 by means of gating devices 100 and 106, respectively. Clearly, the logical complement signal, clock, $\overline{C}$, will be high causing pull down devices 116 and 118 to be conductive. Thus, the control gates of logic gating devices 102 and 104 will be held low thereby decoupling node 108 from latches 84 and 86. As previously described, when node 108 is decoupled from latches 84 and 86, the output of load device 110 will be high. Pull down devices 116 and 118 thus form part of switching means 46 of FIG. 2 and set the exclusive-nor function in a high state during the quiescent phase.

The timing diagram of FIG. 3 may not be substantiated by reference to FIGS. 6 and 7. As just described, during the quiescent phase, clock signal, C, is low and clock signal, $\overline{C}$, is high. The output of load device 78 and load device 110 will both be high. After clock signal, C, goes high and clock signal, $\overline{C}$, goes low and data inputs A and B are presented, the exclusive-nor function, $\overline{\oplus}$, and product function, $\wedge$, will be generated. Assume for the purposes of example that latch 84 has a low or binary zero output while latch 86 has a high or binary one output. Node 96 will be set at a low potential value at the same time as node 98 is set at a high potential value. After a time interval equal to the transmission time through logic gating devices 102 and 104, node 108 and the output of load device 110 will be set at a low potential value. Thus, as illustrated in FIG. 3 the first signal to go low is the signal corresponding to the exclusive-nor function.

After a time interval equal to one gate transmission period of driver device 114, load device 112 will go high. Again as illustrated in FIG. 3 the sum signal corresponding to the exclusive-or function is the next clock signal to change state.

Now, referring to FIG. 6, after one gate transmission interval corresponding to gating device 82 the output of load device 72 begins to go high. Data inputs A and B of FIG. 6 are typically coupled to nodes 96 and 98 respectively of FIG. 7. Assuming that latches 84 and 86 are valid after or at least synchronized with clock signal, C, data input signals, A and B, will be presented to the gates of driver devices 74 and 76 at the same time or shortly after the output of load device 72 begins to go high. In the present example, data input A is assumed to have a binary zero so that the output of load device 72 is permitted to go high and fully charge the gate of driver device 80. Thus, the gate of device 80 is discharged or charged during the same time in which the gates of driver devices 74 and 76 are being charged or discharged. Thus, the output of AND circuit 30, as illustrated in FIG. 6 is delayed after the output of exclusive-nor function,⊕, by one gate transmission interval.

Since the exclusive-nor function leads the product function during the transition phase, the output of AND gate 30 must remain high before and during the entire time in which gating device 32 of FIG. 2 becomes nonconductive. AND gate 30 is disconnected from its corresponding segment of sense propagation path 22 by the time it begins to go low. Therefore, any binary one carry from the adjacent segment of sense propagation path 22 is coupled through gating device 26 onto a precharged segment. As previously discussed, this sequence of operations increases the speed of propagation of the carry input signal along sense propagation path 22, since MOS circuit nodes are capable of quickly discharging and only relatively slowly charging.

While the described embodiments of the present invention have been described in reference to certain specific schematics and MOS circuitry, it is to be understood that further modifications, alterations, and substitutions may be made by those having ordinary skill in the art without departing from the spirit and scope of the present invention.

I claim:

1. A binary adder for adding at least two multiple bit binary numbers comprising:
    a conductive reference propagation path having a plurality of segments;
    a conductive sense propagation path having a plurality of segments;
    a plurality of gating means in series with said reference and sense propagation paths, said gating means for selectively coupling said segments of said reference propagation path together and for selectively coupling said segments of said sense propagation path together;
    a plurality of product circuit means corresponding to a plurality of orders of bits of said multiple bit binary numbers, each product circuit means for generating a product signal of a corresponding order of bits of said multiple bit binary numbers and for coupling said product signal to that segment of said sense propagation path corresponding to the next higher order of bits;
    a plurality of summing circuit means corresponding to a plurality of orders of bits of said multiple bit binary numbers, each summing circuit means for generating a sum signal of a corresponding order of bits of said multiple bit binary numbers and for coupling said summing signal to selected ones of said plurality of gating means; and
    a plurality of output circuit means, each output circuit means coupled to one of said summing circuit means and coupled with selected segments of said sense propagation path, each of said output circuit means for generating an output signal in response to said sum signal and charged state of a corresponding segment of sense propagation path.

2. The binary adder of claim 1 further comprising a plurality of sense amplifier means, each sense amplifier means having inputs coupled to selected points on said reference and sense propagation paths and having an output coupled to one of said output circuit means, said sense amplifier means for detecting a potential difference between said selected points on said reference and sense propagation paths, for generating a detection signal and coupling said detection signal to said output circuit means.

3. The binary adder of claim 2 further comprising:
    a plurality of precharging circuit means for selectively charging and discharging said segments of said reference propagation path; and
    a plurality of switching means for generating a precharging signal and for coupling said precharging signal to said segment of said sense propogation during quiescent operation.

4. The binary adder of claim 3 wherein:
    each of said gating means is a MOS transistor having a first and second region and an overlying insulatively spaced gate, said gate being coupled to one of said summing circuit means, said first region being coupled to the output end of one of said segments of said segmented, sense and reference propagation paths, said segment corresponding to a selected order of bits of said multiple bit binary numbers, said second region being coupled to the input end of an adjacent segment of said segmented sense and reference propagation paths, said adjacent segment corresponding to the next highest order of bits of said multiple bit binary numbers.

5. The binary adder of claim 4 wherein:
    said product circuit means generates a product signal corresponding to said selected order of bits of said multiple bit binary numbers and couples said product signal through a gated line to the input end of a segment of said sense propagation path corresponding to the next highest order of bits of said multiple bit binary numbers, said gated line being gated by said summing circuit means corresponding to said selected order of bits.

6. The binary adder of claim 2 wherein said sense amplifier means comprises:
    a gating device having a control gate coupled to a selected segment of said sense propagation path, a first region of said gating device coupled to a power supply;
    a first inverter stage having a load device and driver device each having a gate and first and second region, said load and driver devices having said first and second regions of each in series circuit, said first inverter having an output coupled to said second region of said load device, said first region of said load device coupled to a second region of said gating device, said gate of said load device being coupled to said first region of said load device and being coupled to ground through a high impendance device, said gate of said driver device being coupled to a segment of said reference propagation path corresponding to said selected segment of said sense propagation path; and
    a second inverter stage having an input coupled to said output of said first inverter stage and having an output coupled to said output circuit means.

7. The binary adder of claim 6 wherein said high impedance device is a high impedance MOS device having a first region coupled to said gate of said load device, a second region coupled to said ground and a gate coupled to said power supply.

8. The binary adder of claim 1 wherein said output circuit means comprises:
- a first and second gating device each having a control gate coupled to said summing circuit means, said logical summing signal being coupled to said control gate of said second gating device, the logical complement of said summing signal being coupled to said control gate of said first gating device;
- a first inverter stage having an input coupled to a selected one of said segments of said sense propagation path and having an output coupled to an output terminal through said first gating device; and
- a second inverter stage having an input coupled to said output of said first inverter stage and having an output coupled to said output terminal through said second gating device.

9. The binary adder of claim 8 wherein said logical summing signal is equivalent to the exclusive-or function of said bits of that order of bits of said multiple bit binary number corresponding to said selected one of said segments.

10. The binary adder of claim 1 wherein said product circuit means comprises a clocked AND gate having a logical high output when disenabled.

11. The binary adder of claim 10 wherein said clocked AND gate comprises:
- a first inverter stage having a load device and a plurality of driver devices coupled in series circuit, said first inverter having a plurality of data inputs, each of said data inputs being coupled to one of said plurality of driver devices, each of said data inputs corresponding to one bit of said order of bits in each of said multiple bit binary numbers, said first inverter stage having an output coupled to ground through a gated line when said data inputs are invalid; and
- a second inverter stage having an input coupled to said output of said first inverter stage and having an output providing a logical high output when said data inputs are invalid and a product function output of said data inputs when said data inputs are valid.

12. The binary adder of claim 1 wherein each of said summing circuit means comprises an exclusive-or gate having an exclusive-or output signal coupled to said gating means and output circuit means corresponding to a first segment of said sense propagation path, and having a logically complemented exclusive-or output signal coupled to said product circuit means corresponding to a second segment of said sense propagation path, said first and second segments being coupled by said gating means.

13. The binary adder of claim 12 wherein said exclusive-or gate comprises:
- a first and second data input terminal;
- a first gating device having a control gate coupled to said second data input terminal, and having a first region coupled to said first data input terminal;
- a second gating device having a control gate coupled to said first data input terminal, and having a first region coupled to said second data input terminal;
- an inverter stage having an input coupled to a second region of said first and second gating devices, and having an output generating said exclusive-or output signal; and
- a load device in series circuit between a power supply and said second regions of said first and second gating devices and an output coupled to said second regions and generating the logical complement of said exclusive-or output signal.

14. In a binary adder circuit for adding at least two multiple bit binary numbers having a plurality of corresponding unit circuits, and a plurality of corresponding sense and reference propagation path segments, a unit circuit corresponding to one order of bits of said multiple bit binary numbers and at least one said unit circuit comprising:
- a conductive segment of a reference propagation path;
- a conductive segment of a sense propagation path;
- gating means in series with said segments of said reference and sense propagation paths, said gating means for selectively coupling said segments of said sense and reference propagation paths with corresponding sense and reference propagation path segments in said binary adder circuit;
- product circuit means for generating a logical product signal of said one order of bits of said multiple bit binary numbers and for selectively coupling said product signal with said corresponding sense propagation path segment in said binary adder circuit;
- summing circuit means for generating a logical summing signal of said one order of bits of said multiple bit binary numbers and for coupling said summing signal to said gating means; and
- output circuit means for generating an output signal in response to said sum signal and to the charged state of said segment of said sense propagation path, said output circuit means coupled to said summing circuit means and said segment of said sense propagation path.

15. In the binary adder circuit of claim 14 said at least one said unit circuit further comprising sense amplifier means having a first input coupled to said segment of said sense propagation path, having a second input coupled to said segment of said reference propagation path, and having an output coupled to said output circuit means, said sense amplifier means for generating a differential detection signal of the potential difference between said segments of said sense and reference propagation paths and for coupling said detection signal to said output circuit means.

16. In the binary adder circuit of claim 15 said at least one said unit circuit further comprising:
- precharging circuit means for selectively charging and discharging said segment of said reference propagation path, said precharging circuit means coupled to said segment of said reference propagation path; and
- switching means for generating a precharging signal and for coupling said precharging signal to said segment of said sense propagation path during quiescent operation.

17. In the binary adder circuit of claim 16 wherein said switching means is coupled to said sense propagation path through said product and summing circuit means.

18. A method for adding at least two multiple bit binary numbers comprising the steps of:

precharging at least some segments of a segmented sense propagation path by a switching means and precharging each segment of a segments reference propagation path by a precharging means to a logical high potential value, said segments each being one of a plurality of segments forming said segmented sense and reference propagation paths, each segments of said sense propagation path being paired with a segment of said reference propagation path and corresponding to a selected order of bits of said multiple bit binary numbers to be added, said switching means for generating a precharging signal, said precharging means for selectively charging and discharging said segments of said reference propagation path;

generating a plurality of sum signals and a plurality of product signals in a corresponding plurality of summing circuit means and product circuit means respectively, each of said product circuit means for generating one of said product signals having a logical potential value equivalent to the logical product function of said bits of one said order corresponding to one of said segments, each of said summing circuit means for generating one of said sum signals having a logical potential value equivalent to the logical complement of the exclusive-or function of said bits of one said orders corresponding to one of said segments, each pair of said segments having corresponding summing and product circuit means associated thereto;

coupling each one of said sum signals to a corresponding carry gating means, to a corresponding inverter coupled to a propagation gating means, and to a corresponding output circuit means, each of said carry gating means for selectively coupling one of said product signals to a segment of said sense propagation path corresponding to the next higher order of bits of said multiple bit binary numbers to be added, said sum signal being applied to said carry gating means before said product each of said propagation gating means for selectively coupling said corresponding pair of segments of said sense and reference propagation paths respectively to segments of said sense and reference propagation paths corresponding to the next higher order of bits, each of said output circuit means for generating an output signal having logical potential values equivalent to the exclusive-or function of said corresponding sum signal and of said logical potential value of said corresponding segment of said sense propagation path; and selectively discharging each of said segments of said reference propagation path, each of said output signals being valid during the discharge of said segments of said segmented reference propagation path.

19. The method of claim 18 wherein each of said output circuit means is coupled to said corresponding segment of said sense propagation path by a sense amplifier having said corresponding segments of said sense and reference propagation paths as inputs.

20. The method of claim 19 wherein said sense amplifier comprises:

a gating device having a control gate coupled to a selected segment of said sense propagation path, a first region of said gating device coupled to a power supply;

a first inverter stage having a gate and a first and second region, said load and driver devices having said first and second regions of each in series circuit, said first region of said load device being coupled to a second region of said gating device, said gate of said load device being coupled to said first region of said load device and being coupled through a high impedance device to ground, said gate of said driver device being coupled to said segment of said reference propagation path, said first inverter stage having an output coupled to said second region of said load device; and a second inverter stage having an input coupled to said output of said first inverter stage and having an output coupled to said output circuit means.

21. The method of claim 20 wherein said high impedance device is a high impedance insulated gate device having a first region coupled to said gate of said load device, a second region coupled to said ground, and a gate coupled to said power supply.

* * * * *